UNITED STATES PATENT OFFICE.

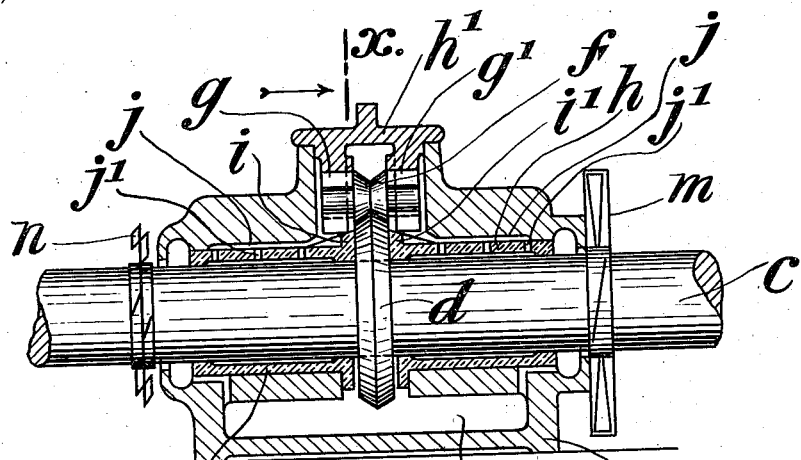
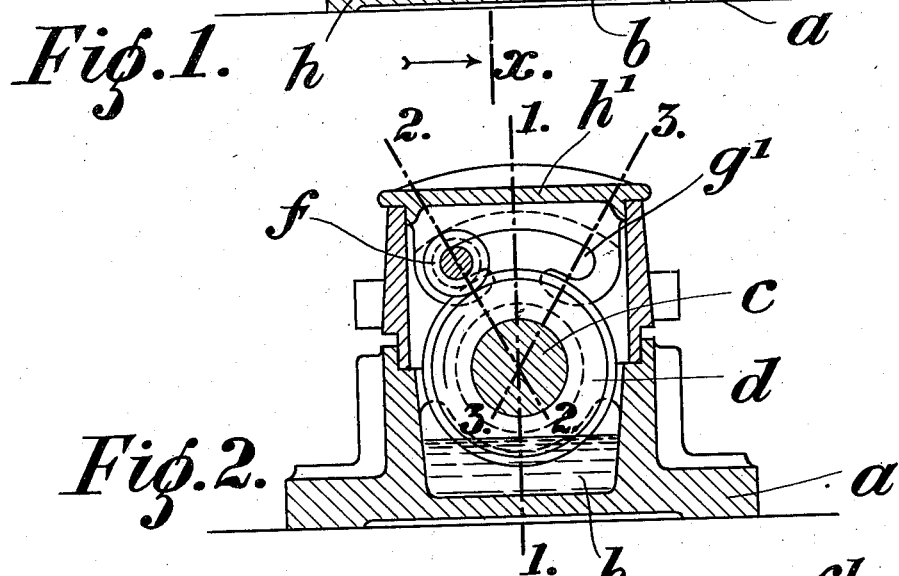
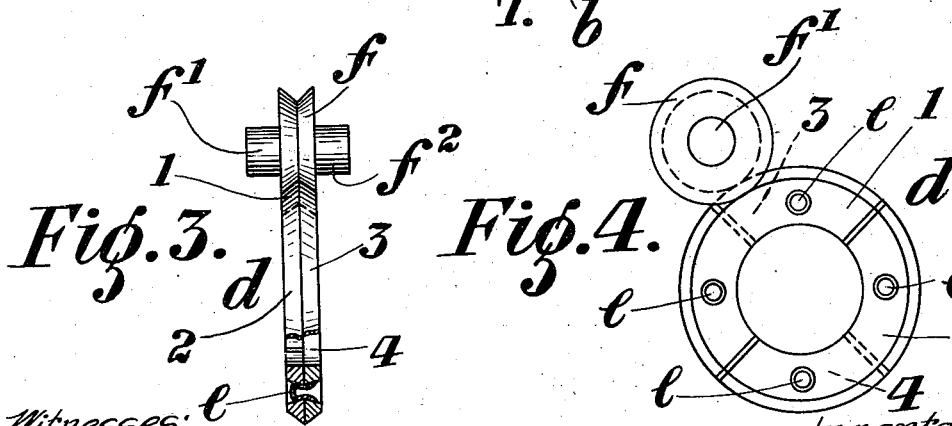
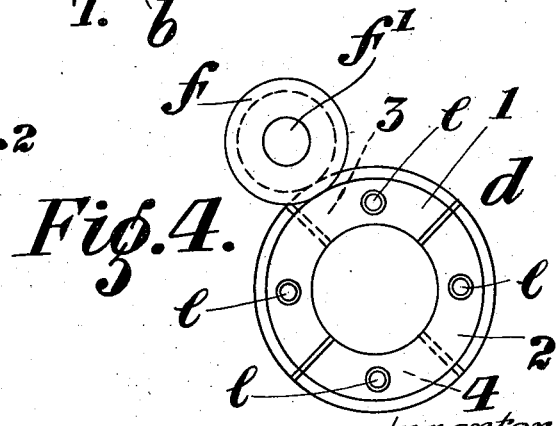

WILLIAM HENRY LINDSAY, OF JOHNSTONE, SCOTLAND.

SELF-LUBRICATING BEARING FOR SHAFTS.

1,216,821.  Specification of Letters Patent.  Patented Feb. 20, 1917.

Application filed March 8, 1916. Serial No. 82,890.

*To all whom it may concern:*

Be it known that I, WILLIAM HENRY LINDSAY, a subject of the King of Great Britain, residing at Johnstone, Scotland, have invented certain new and useful Improvements in and Relating to Self-Lubricating Bearings for Shafts, of which the following is a specification.

This invention relates to self lubricating bearings for shafts of the type having a ring or collar upon and revolving with the shaft and means for arresting lubricant rollable on the periphery of the ring or collar. In such bearings the lower side of the ring or collar dips into an oil well, and, as the ring revolves, it carries a certain amount of oil around with it this oil being arrested by the rollable means and caused to flow down on to the shaft. The rollable means is preferably a small roller.

Under this invention the parts are so arranged that the roller does not occupy a central position above the ring or collar but always rests at one side or other of the center line. It is carried between curvilinear guides and is capable of moving into position at one side or other of the center line according to the direction of revolution of the shaft. The roller is automatically moved from the one position to the other by the action of the collar. Owing to the fact that the roller assumes a position out of the center line it causes the oil, carried upward by the collar, to pile up to a certain extent and therefore flow the more readily down onto the brasses. The collar which has a Λ shaped periphery is made in parts preferably secured together by spring split pins or the like. The roller has a V groove so that its periphery is correlative to that of the collar.

In order that the invention may be clearly understood I have hereunto appended explanatory drawings whereon I have shown, by way of example, a mode of carrying the invention into effect or practice.

On the drawings:—

Figure 1 is a sectional view of a pedestal bearing.

Fig. 2 is a cross section taken on the line *x—x* Fig. 1 and looking in the direction of the arrows.

Fig. 3 is an enlarged view of the collar and its roller the collar being shown partly in section.

Fig. 4 is a side view corresponding to Fig. 3.

$a$ is the pedestal bearing with oil well $b$. $c$ is the shaft. $d$ is the collar on the shaft. $f$ is the roller. $m$ is a fan mounted on the shaft at one side of the bearing. $n$ is another fan mounted on the shaft at the other side of the bearing. $h$ are the brasses.

In carrying out the invention according to the construction shown at Figs. 1 to 4, I make the collar $d$ of four semicircular segments, 1, 2, 3 and 4 the two segments 1 and 2 having their lines of junction disposed at right angles to the lines of junction of the segments 3 and 4. The segments are secured together by means of spring split pins $e$, of which there may be four, these split pins being compressed and then pushed through taper holes in the segments and allowed to expand thus locking the segments tightly together. In Fig. 3 one of the split pins is shown in section and in position. The periphery of the collar is of Λ shape and, running upon the periphery, is a small roller $f$ which has a corresponding V shaped groove in its periphery. Pins $f^1$, $f^2$, project from the roller and these pins can turn freely in curvilinear guides $g$, $g^1$, depending from and forming part of a cover $h^1$ so that, when the cover is removed, the roller can be moved along with it. It will be seen that, at the underside of the guides, a gap is left, as shown at Fig. 2, and this allows the oil or other lubricant which is arrested by the roller and piled up in front of it to pass freely down either side of the collar $d$ and thence on to inclines $i$, $i^1$, on the brasses $h$ and along the ducts $j$ to the lubricating holes $j^1$ in said brasses.

When the shaft $c$ is rotated in an anti-clockwise direction (Fig. 2) the roller $f$ will rest in its guides, at the left hand side of the center line 1—1, representing a vertical plane through the shaft axis its center being on the line 2—2, representing an inclined plane through the shaft axis, but when the shaft is reversed the roller will be carried over to the opposite side and rest in the guides on the line 3—3, representing an inclined plane through the shaft axis.

As it is desirable, in most cases, to fix the collar $d$ firmly on the shaft I, to do this, prefer to undercut the collar at each side thereof so as to leave flanges around the shaft, the collar being tightened by compressing the flanges, by means of a flat nosed chisel or other tool which is applied to the flanges, here and there, and struck a few sharp blows.

Having now fully described my invention what I claim and desire to secure by Letters Patent is:—

1. The combination with a shaft of a self lubricating bearing therefor, said bearing comprising, shaft supporting means, a receptacle for lubricant, lubricant carrying means revoluble with the shaft and dipping into the receptacle, and means for arresting lubricant rollable on said revoluble means and occupying a position other than vertical to the center of the shaft.

2. The combination with a shaft of a self lubricating bearing therefor, said bearing comprising, shaft supporting means, a receptacle for lubricant, lubricant carrying means revoluble with the shaft and dipping into the receptacle, means for arresting lubricant rollable on said revoluble means and movable by the revoluble means to a position at one side or other of a vertical plane through the axis of the shaft according to the direction of revolution of said shaft.

3. The combination with a shaft of a self lubricating bearing therefor, said bearing comprising, shaft supporting means, a receptacle for lubricant, lubricant carrying means revoluble with the shaft and dipping into the receptacle, means for arresting lubricant rollable on said revoluble means and occupying a position other than vertical to the center of the shaft and guiding and supporting means for said rollable means.

4. The combination with a shaft of a self lubricating bearing therefor, said bearing comprising, shaft supporting means, a receptacle for lubricant in connection therewith, a collar revoluble with the shaft and dipping into the receptacle, a roller bearing on the periphery of the collar and movable by the latter to a position at one side or other of a vertical plane through the axis of the shaft according to the direction of the revolution of said shaft.

5. The combination with a shaft of a self lubricating bearing therefor, said bearing comprising, shaft supporting means, a receptacle for lubricant in connection therewith, a collar revoluble with the shaft and dipping into the receptacle, a roller bearing on the periphery of the collar and movable by the latter to a position at one side or other of a vertical plane through the axis of the shaft according to the direction of the revolution of said shaft and guiding and supporting means for the roller.

6. The combination with a shaft of a self lubricating bearing therefor, said bearing comprising, shaft supporting means including an upper cover portion, a receptacle for lubricant in connection therewith, a collar revoluble with the shaft, guides depending from said upper cover portion above the collar, and a roller carried in said guides and movable therein by the collar to a position at one side or other of the guides.

7. The combination with a shaft of a self lubricating bearing therefor, said bearing comprising, shaft supporting means including an upper cover portion, a receptacle for lubricant in connection therewith, a collar revoluble with the shaft, curvilinear guides depending from said upper cover portion and a roller freely supported in said guides and bearing on the periphery of the collar.

8. The combination with a shaft of a self lubricating bearing therefor, said bearing comprising, shaft supporting means including an upper cover portion, a receptacle for lubricant in connection therewith, a collar revoluble with the shaft, curvilinear guides depending from said upper cover portion with an opening at their under sides, and a roller freely supported in said guides and bearing on the periphery of the collar.

9. The combination with a shaft of a self lubricating bearing therefor, said bearing comprising, shaft supporting means including an upper cover portion, a receptacle for lubricant in connection therewith, a collar revoluble with the shaft, guides depending from and removable with the cover, and a roller freely supported in said guides and bearing on the periphery of the collar.

10. The combination with a shaft of a self lubricating bearing therefor, said bearing comprising, shaft supporting means including an upper cover portion, a receptacle for lubricant in connection therewith, a collar revoluble with the shaft, curvilinear guides depending from said upper cover portion, and a roller freely supported in said guides and bearing on the periphery of the collar, and capable of being moved from side to side of the guides by said collar.

11. The combination with a shaft of a self lubricating bearing therefor, said bearing comprising, shaft supporting means, a receptacle for the lubricant in connection therewith, a sectional collar capable of being fitted on the shaft so as to revolve therewith, a roller bearing on the periphery of the collar and movable to a position at one side or other of a vertical plane through the axis of the shaft under the action of the collar and according to the direction of the revolution thereof, and supporting means for the roller.

12. The combination with a shaft of a self lubricating bearing therefor said bearing comprising, shaft supporting means including a cover portion, a receptacle for lubricant in connection therewith, a plurality of segments, means securing said segments together on the shaft to form a collar revoluble therewith, guides on said cover portion above said collar, and a roller bearing on the periphery of said collar and carried in said guides and movable therein to a position at one side or other of a vertical plane through the shaft axis.

13. The combination with a shaft of a self lubricating bearing therefor, said bearing comprising, shaft supporting means, a receptacle for lubricant in connection therewith, a collar revoluble with the shaft and having an inclined periphery, a roller with inclined periphery bearing on the collar and movable under its action to a position at one side or other of a vertical plane through the shaft axis.

14. The combination with a shaft of a self lubricating bearing therefor, said bearing comprising, shaft supporting means including a cover portion, a receptacle for lubricant, a collar revoluble with the shaft and having an inclined periphery, guides on said cover portion and a roller with inclined periphery bearing on the collar carried in said guides and movable therein under the action of the collar to a position at one side or other of a vertical plane through the axis of the shaft.

15. The combination with a shaft of a self lubricating bearing therefor, said bearing comprising shaft supporting means, a receptacle for lubricant, a collar having an angular periphery, a roller with correlative periphery bearing on the collar and movable under its action to a position at one side or other of a vertical plane through the axis of the shaft, and guiding and supporting means for the roller.

16. The combination with a shaft of a self lubricating bearing therefor, said bearing comprising, shaft supporting means including a cover portion, a receptacle for lubricant, a collar revoluble with the shaft and having an arched periphery, guides depending from said cover portion above the collar, and a roller with an incised periphery bearing on the periphery of the collar carried in said guides and movable therein under the action of the collar.

17. The combination with a shaft of a self lubricating bearing therefor, said bearing comprising, shaft supporting means, including a receptacle for lubricant, a cover portion and bearing brasses with passageways for the lubricant; a collar revoluble with the shaft, guides on said cover portion, a roller bearing on the periphery of the collar carried in said guides and movable therein under the action of the collar to a position at one side or other of a vertical plane through the axis of the shaft.

18. The combination with a shaft of a self lubricating bearing therefor, said bearing comprising, shaft supporting means, a receptacle containing lubricant, lubricant carrying means revoluble with the shaft and dipping into said lubricant, and lubricant arresting means, capable of movement through an arc of a circle, contacting with and rotatable by said revoluble means.

19. The combination with a shaft of a self lubricating bearing therefor, said bearing comprising, shaft supporting means, a receptacle containing lubricant, lubricant carrying means revoluble with the shaft and dipping into said lubricant, lubricant arresting means, capable of movement through an arc of a circle, contacting with and rotatable by said revoluble means and means for guiding and supporting said rotatable means during its arcuate movements.

20. The combination with a shaft of a self lubricating bearing therefor, said bearing comprising, shaft supporting means, a receptacle containing lubricant, lubricant carrying means revoluble with the shaft and dipping into said lubricant, and lubricant arresting means, capable of movement through an arc of a circle, contacting with and rotatable by said revoluble means.

21. The combination with a shaft of a self lubricating bearing therefor, said bearing comprising, shaft supporting means, a receptacle containing lubricant, a segmental collar revoluble with the shaft and dipping into said lubricant, and lubricant arresting means, capable of movement through an arc of a circle, contacting with and rotatable by said revoluble means.

In testimony whereof I affix my signature in presence of two witnesses.

WILLIAM HENRY LINDSAY.

Witnesses:
 Jas. Mair,
 Wm. Meikle.